(12) United States Patent
Marchesotti et al.

(10) Patent No.: US 8,537,409 B2
(45) Date of Patent: Sep. 17, 2013

(54) IMAGE SUMMARIZATION BY A LEARNING APPROACH

(75) Inventors: Luca Marchesotti, Grenoble (FR); Claudio Cifarelli, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1332 days.

(21) Appl. No.: 12/250,248

(22) Filed: Oct. 13, 2008

(65) Prior Publication Data
US 2010/0091330 A1    Apr. 15, 2010

(51) Int. Cl.
*G06K 15/00* (2006.01)

(52) U.S. Cl.
USPC ......... 358/1.18; 358/3.27; 358/3.28; 358/1.9; 358/504; 358/1.13; 358/518; 382/195; 382/165; 382/218; 382/291; 382/154; 382/261; 382/298; 382/224; 382/225; 382/226; 382/227; 382/228

(58) Field of Classification Search
None
See application file for complete search history.

(56) References Cited

U.S. PATENT DOCUMENTS

| | | | |
|---|---|---|---|
| 5,978,519 A | 11/1999 | Bollman et al. | |
| 6,545,743 B1 | 4/2003 | Luo et al. | |
| 6,741,756 B1 * | 5/2004 | Toyama et al. | 382/291 |
| 7,034,848 B2 | 4/2006 | Sobol | |
| 7,567,707 B2 * | 7/2009 | Willamowski et al. | 382/167 |
| 7,567,730 B2 * | 7/2009 | Ohguro | 382/290 |
| 7,809,185 B2 * | 10/2010 | Li et al. | 382/155 |
| 7,907,774 B2 * | 3/2011 | Parr et al. | 382/154 |
| 8,045,804 B2 * | 10/2011 | Zeng et al. | 382/188 |
| 8,135,189 B2 * | 3/2012 | Jerebko et al. | 382/128 |
| 8,144,368 B2 * | 3/2012 | Rodriguez et al. | 358/3.28 |
| 8,165,401 B2 * | 4/2012 | Funayama et al. | 382/190 |
| 2002/0135621 A1 | 9/2002 | Angiulo et al. | |
| 2004/0205627 A1 | 10/2004 | Rosenholtz et al. | |
| 2006/0067573 A1 * | 3/2006 | Parr et al. | 382/154 |
| 2006/0072847 A1 | 4/2006 | Chor et al. | |
| 2006/0085743 A1 | 4/2006 | Baudisch et al. | |
| 2006/0109282 A1 | 5/2006 | Lin et al. | |
| 2006/0280364 A1 | 12/2006 | Ma et al. | |
| 2007/0005356 A1 | 1/2007 | Perronnin | |
| 2007/0025643 A1 | 2/2007 | LeMeur et al. | |
| 2007/0104362 A1 * | 5/2007 | Hwang et al. | 382/159 |
| 2007/0239745 A1 | 10/2007 | Guarraz et al. | |
| 2007/0253040 A1 * | 11/2007 | Lee et al. | 358/518 |
| 2007/0258648 A1 | 11/2007 | Perronnin | |

(Continued)

FOREIGN PATENT DOCUMENTS

| | | |
|---|---|---|
| EP | 1748385 | 1/2007 |
| EP | 1764736 | 3/2007 |

OTHER PUBLICATIONS

U.S. Appl. No. 11/391,864, filed Mar. 29, 2006, Guerraz, et al.
U.S. Appl. No. 11/524,100, filed Sep. 13, 2006, Perronnin.

(Continued)

*Primary Examiner* — Hilina K Demeter
(74) *Attorney, Agent, or Firm* — Fay Sharpe LLP

(57) ABSTRACT

An automated system and a method for extracting a region of interest from a digital image are disclosed. The method includes identifying a subset of training images from a larger set of training images, each training image in the set having a respective identified region of interest. The subset is identified based on a measure of similarity between the digital image and the images in the set of training images. At least one region of interest is extracted from the digital image based on an analysis of the identified regions of interest in the subset of training images.

23 Claims, 5 Drawing Sheets

(56) References Cited

U.S. PATENT DOCUMENTS

| | | |
|---|---|---|
| 2008/0069456 A1 | 3/2008 | Perronnin |
| 2008/0144068 A1 | 6/2008 | Digby |
| 2009/0244309 A1* | 10/2009 | Maison et al. ............. 348/222.1 |
| 2010/0034423 A1* | 2/2010 | Zhao et al. .................... 382/103 |

OTHER PUBLICATIONS

U.S. Appl. No. 11/767,739, filed Jun. 25, 2007, Bressan, et al.
U.S. Appl. No. 11/801,230, filed May 9, 2007, Marchesotti, et al.
U.S. Appl. No. 12/033,434, filed Feb. 19, 2008, Csurka.
U.S. Appl. No. 12/049,520, filed Mar. 17, 2008, Marchesotti, et al.
U.S. Appl. No. 12/123,511, filed May 20, 2008, Marchesotti, et al.
U.S. Appl. No. 12/123,586, filed May 20, 2008, Marchesotti.
U.S. Appl. No. 12/175,857, filed Jul. 18, 2008, Marchesotti.
U.S. Appl. No. 12/191,579, filed Aug. 14, 2008, Csurka, et al.
U.S. Appl. No. 61/056,189, filed May 27, 2008, Mestha, et al.
Itti, et al., A Saliency-Based Search Mechanism for Overt and Covert Shifts of Visual Attention, *Vision Research*, vol. 40, pp. 1489-1506 (2000).
Lowe, Object Recognition From Local Scale-Invariant Features, *ICCV Intl. Conf. on Computer Vision*, 1999.
Luo, Subject Content-Based Intelligent Cropping of Digital Photos, *Multimedia and Expo, 2007 IEEE International Conference*, pp. 2218-2221, Jul. 2-5, 2007.
Verbeek, et al., Gaussian Fields for Semi-Supervised Regression and Correspondence Learning, *Pattern Recognition*, vol. 39, No. 10, pp. 1864-1875, Oct. 2006.

\* cited by examiner

IMAGE SUMMARIZATION BY A LEARNING APPROACH

CROSS REFERENCE TO RELATED PATENTS AND APPLICATIONS

The following copending applications, the disclosures of which are incorporated herein by reference in their entireties, are mentioned:

U.S. application Ser. No. 11/801,230, filed May 9, 2007, entitled PRINT JOB AESTHETICS ENHANCEMENTS DETECTION AND MODELING THROUGH COMBINED USER ACTIVITY ANALYSIS AND CONTENT MATCHING, by Luca Marchesotti, et al.

U.S. application Ser. No. 11/767,739, filed Jun. 25, 2007, entitled CLASS-BASED IMAGE ENHANCEMENT SYSTEM, by Marco Bressan, et al.

U.S. application Ser. No. 12/033,434, filed Feb. 19, 2008, entitled CONTEXT DEPENDENT INTELLIGENT THUMBNAIL IMAGES, by Gabriela Czurka.

U.S. application Ser. No. 12/049,520 filed Mar. 17, 2008, entitled AUTOMATIC GENERATION OF A PHOTO GUIDE, by Luca Marchesotti, et al.

U.S. patent application Ser. No.: 12/123,511, filed May 20, 2008, entitled IMPROVING IMAGE VISUALIZATION THROUGH CONTENT-BASED INSETS, by Luca Marchesotti, et al.

U.S. application Ser. No. 12/123,586, filed May 20, 2008, entitled METHOD FOR AUTOMATIC ENHANCEMENT OF IMAGES CONTAINING SNOW, by Luca Marchesotti.

U.S. application Ser. No. 12/175,857, filed Jul. 18, 2008, entitled SYSTEM AND METHOD FOR AUTOMATIC ENHANCEMENT OF SEASCAPE IMAGES, by Luca Marchesotti.

U.S. application Ser. No. 12/191,579, filed on Aug. 14, 2008, entitled SYSTEM AND METHOD FOR OBJECT CLASS LOCALIZATION AND SEMANTIC CLASS BASED IMAGE SEGMENTATION, by Gabriela Czurka, et al.

U.S. Provisional Application Ser. No. 61/056,189, filed May 27, 2008, entitled IMAGE INDEXED RENDERING OF IMAGES FOR TUNING IMAGES FROM MULTIPLE PRINT ENGINES, by Lalit K. Mestha, et al.

BACKGROUND

The exemplary embodiment relates to digital image processing. It finds particular application in connection with the automated extraction of regions of interest from images based on previously identified regions of interest of similar images.

Image summarization involves the selection of one or more regions of interest (ROI) in an image. There are many instances where it is desirable to extract a region of interest from a digital image which is representative of the image but which contains only a subset of the image data. These include magnifying or zooming in on a desired subject in the image, image asset management, and the like. For example, thumbnail images cropped from an original image are widely used as means of conveying information, such as identifying a source image, a document containing the image, a set of images comprising the image, or the like. In the context of web browsing, for example, a user may review thumbnail images as a way to identify potentially relevant documents related to the subject matter shown in the thumbnail image. Cropping of images is used to suit display formats, such as computer and TV screens, digital picture frames, and print sizes, such as 4×6 and 8×10. Mobile devices, such as cellular phones and MP3 players often have displays which are too small for an entire image to be displayed without significant loss of detail. Cropped images are also incorporated into documents in place of an original image where space constraints do not permit an entire image to be included or where only a portion of the image is of interest.

Simple approaches are commonly employed for cropping images, which may take the center of the image as the center of the region to crop. Other approaches exploit face or skin detection techniques and saliency maps. One problem with such approaches is that automated cropping techniques often fail to identify regions which are likely to be true regions of interest to an observer.

INCORPORATION BY REFERENCE

The following references, the disclosures of which are incorporated in their entireties by reference, are mentioned:

U.S. Pub. No. 20060085743, published Apr. 20, 2006, entitled SEMANTIC THUMBNAILS, by Patrick Markus Baudisch, et al. discloses a method for displaying a page formed of discrete elements, such as a Web page, on different computing devices. The method converts the page into a semantic thumbnail, which preserves the overall appearance of the page and displays readable text segments that enable a user to identify main areas of the page. The semantic thumbnail is adaptable to different screen sizes and target font sizes. The method enlarges unreadable text segments in a miniature version of the page. The method also trims the enlarged text segments to fit the width of the semantic thumbnail by summarizing or cropping text in the enlarged text segments.

U.S. Pub. No. 20020135621, published Sep. 26, 2002, entitled AUTO THUMBNAIL GALLERY, by Michael A. Angiulo, et al., discloses a tool that enables a user to create a photo gallery of thumbnail images on a Web page. A user selects a group of original images, and the tool automatically produces a corresponding group of thumbnail images on the Web page, with hyperlinks to the corresponding original images.

U.S. Pub. No. 20040205627, published Oct. 14, 2004, entitled METHODS AND SYSTEMS FOR GENERATING ENHANCED THUMBNAILS, by Ruth E. Rosenholtz, et al., discloses thumbnails in which one or more elements, such as a document header, or keywords specified by a user, are modified to facilitate review by the user. The enhanced thumbnails are produced by generating a reduced-size representation associated with the document, and modifying the appearance of at least one element in the reduced-size representation. The appearance of the at least one element may be modified by modifying its appearance while in a document format, and/or by modifying its appearance after being converted to a reduced-size representation.

U.S. Pub. No. 20070025643, entitled METHOD AND DEVICE FOR GENERATING A SEQUENCE OF IMAGES OF REDUCED SIZE, by Olivier Le Meur, et al., and related EP1748385 and EP1764736, disclose a method for generating a reduced image having a size smaller or equal to that of a source image. The at least one reduced image is generated by extracting an image part from the source image whose size and position depend on the perceptual interest of the pixels in the image part.

U.S. Pub. No. 20060280364 entitled AUTOMATIC IMAGE CROPPING SYSTEM AND METHOD FOR USE WITH PORTABLE DEVICES EQUIPPED WITH DIGITAL CAMERAS, by Ma, et al., discloses an automatic image cropping system for use with a portable device having an image capture mechanism and a limited resource for storing or transmitting captured information. The system includes a region of interest suggestion engine which selects an image region candidate determined as likely to be of most interest to the user.

U.S. Pub No. 2007/0239745, entitled HIERARCHICAL CLUSTERING WITH REAL-TIME UPDATING, published Oct. 11, 2007, by Agnes Guerraz, et al. discloses a method for updating a probabilistic clustering system defined at least in part by probabilistic model parameters indicative of word counts, ratios, or frequencies characterizing classes of the clustering system.

U.S. Pub. No. 2007/0005356, entitled GENERIC VISUAL CATEGORIZATION METHOD AND SYSTEM, U.S. Pub. No. 2007/0258648, entitled GENERIC VISUAL CLASSIFICATION WITH GRADIENT COMPONENTS-BASED DIMENSIONALITY ENHANCEMENT, and U.S. Pub. No. 2008/0069456 entitled BAGS OF VISUAL CONTEXT-DEPENDENT WORDS FOR GENERIC VISUAL CATEGORIZATION, all by Florent Perronnin, disclose systems and methods for categorizing images based on content.

U.S. Pub. No. 2008/0144068, published Jun. 19, 2008, entitled PRINTER WITH IMAGE CATEGORIZATION CAPABILITY, by Anthony Digby, discloses a printer which prints images according to an image content-based category.

BRIEF DESCRIPTION

In accordance with one aspect of the exemplary embodiment, a method for extracting a region of interest from a digital image is provided. The method includes, identifying, from a set of training images, each training image in the set having a respective identified region of interest, a subset of the training images, based on a measure of similarity between the digital image and the images in the set of training images. A region of interest for the digital image is extracted, based on the identified regions of interest in the subset of training images.

In accordance with one aspect of the exemplary embodiment, a computer implemented system for extracting a region of interest from a digital image is provided. The system includes memory which stores a set of training images, each training image in the set being associated with a respective identified region of interest. An image identification component identifies a subset of the training images, based on a computed similarity measure between the digital image and the images in the set of training images. A probability estimator, for pixels of the digital image, estimates the probability of being in a region of interest, based on the identified regions of interest of the subset of training images. A region of interest extractor extracts a region of interest for the digital image based on the estimated probabilities.

In accordance with one aspect of the exemplary embodiment, a computer-implemented method for extracting a region of interest from an image is provided. The method includes providing a set of training images, each training image in the set being associated with reference coordinates of a respective manually-identified region of interest in the image, receiving an original image for which a region of interest is to be extracted, for the original image, and identifying a subset of K nearest neighbor training images from the set of training images. The method further includes generating a first probability map for the original image which assigns to pixels of the image, a probability of being in a region of interest based on the reference coordinates of the regions of interest in the K nearest neighbor training images and optionally, generating a second probability map for the original image which assigns to pixels of the image a probability of being in a region of interest based on saliency features. A region of interest for the original image is extracted, based on the first probability map and optionally the second probability map.

DETAILED DESCRIPTION

Aspects of the exemplary embodiment relate to a system and method for extracting a region of interest (ROI) from a digital image and to a computer program product encoding instructions for performing the method.

The system and method rely on a dataset of training images for which an ROI has been manually identified for each image. When a new original image is to be automatically processed to identify an ROI, a subset of the training images is automatically selected, based on a computed measure of similarity with the original image. A probable ROI in the original image is then identified, based at least in part on reference coordinates of the manually identified ROIs in the subset of training images. Optionally, other detection techniques, such as face and saliency detection may also be used in automatically extracting an ROI from the original image.

The exemplary system and method may be fully automated or may allow for a certain amount of user input. As used herein, a user can be any person accessing the system, such as a photographer who generated the image, an operator of a print shop, or a person interacting with a workflow in which the image is being processed to form a document, or the like.

The exemplary system and method make use of a learning approach for solving the image summarization problem. In particular, the system learns how to crop an image given its appearance and a training dataset containing full scale images along with a manually segmented ROI for each. A cropping method based on a model learned using an existing dataset is also provided.

Figure 1:
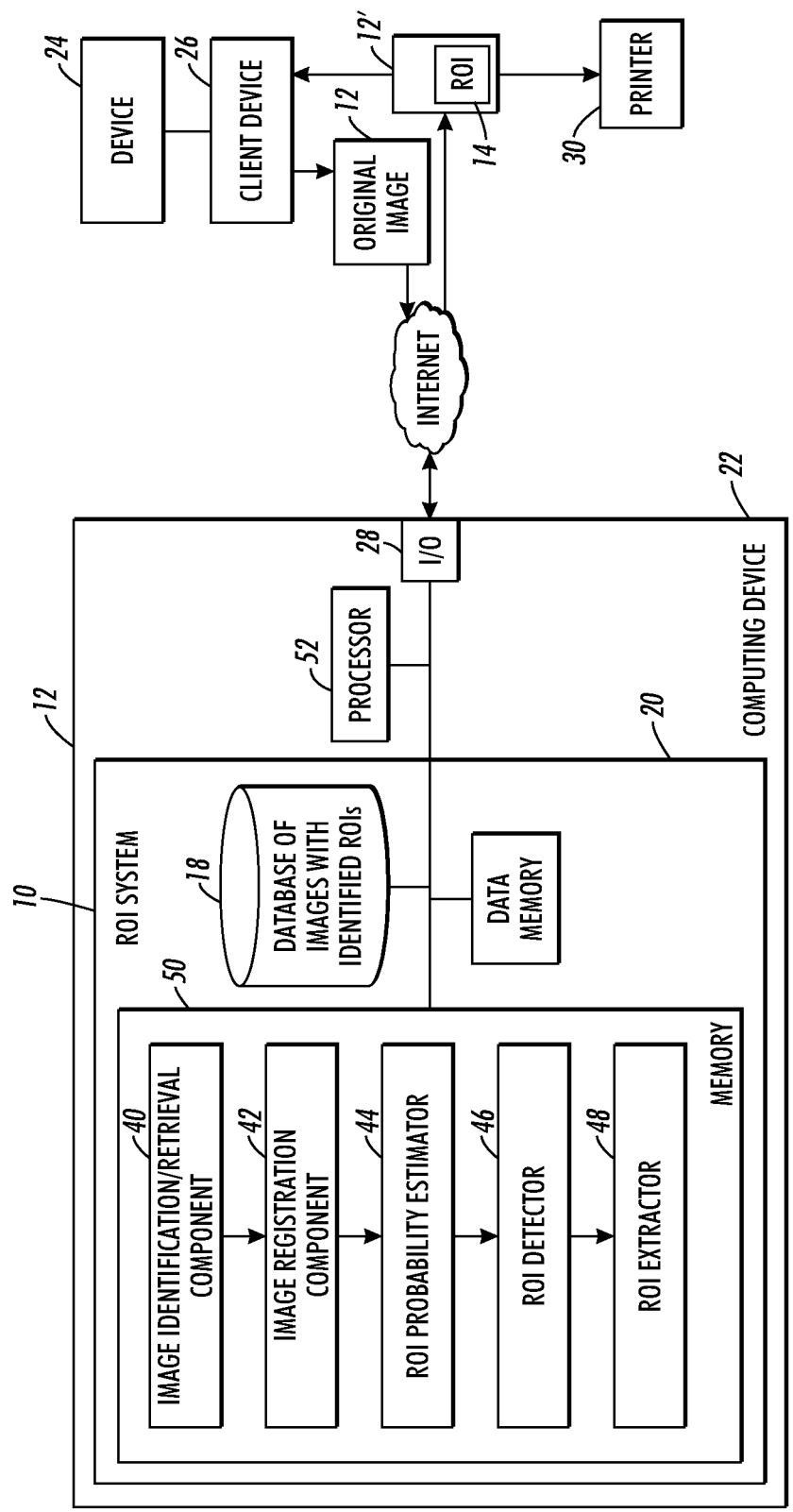
FIG. 1 is a functional block diagram of a computer implemented system for extracting a region of interest (ROI) from an input image in accordance with one implementation of the exemplary embodiment.
Figure 2:
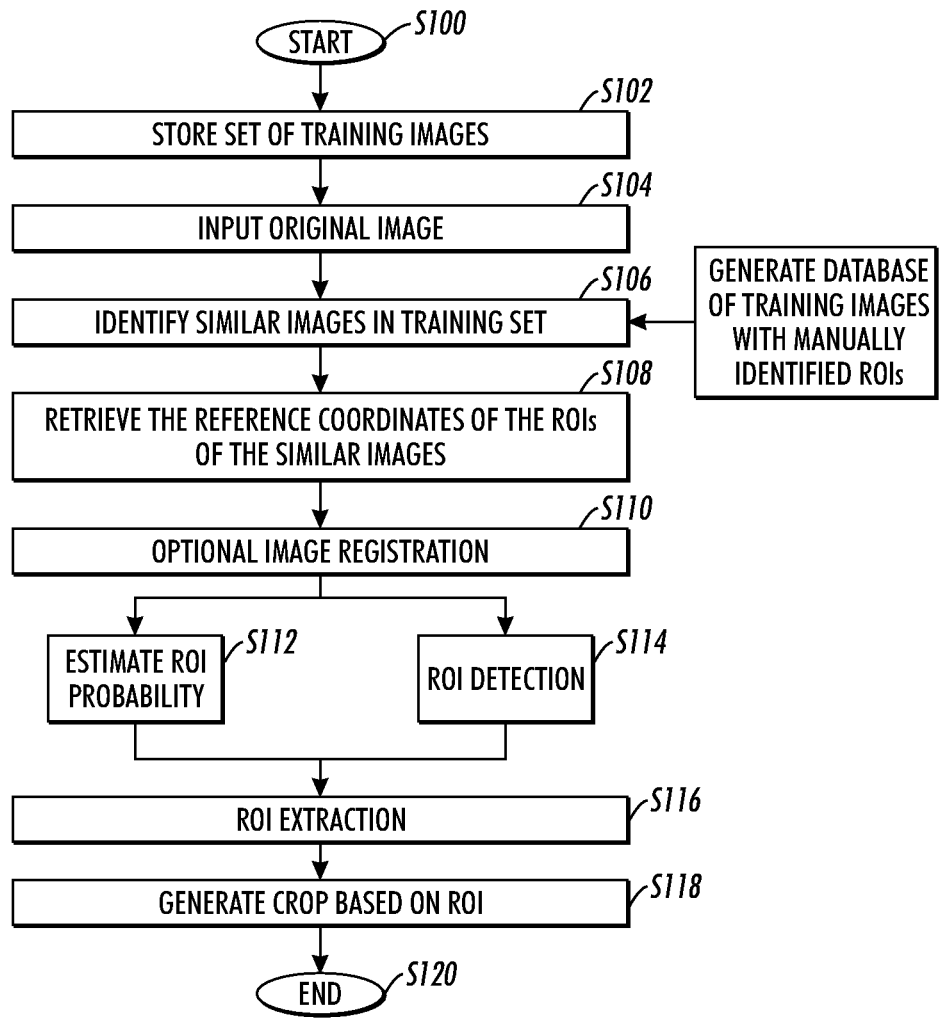
FIG. 2 illustrates an exemplary method for extracting a region of interest from an input image in accordance with another implementation of the exemplary embodiment.

FIG. 1 illustrates an exemplary automated image processing system (ROI system) 10 which may be used in performing the exemplary method described herein with reference to FIG. 2. The system 10 receives, as input, image data comprising an original image 12, such as a photograph, scanned image, or the like, and outputs an ROI or crop 14 derived therefrom. In general, an acquired original image 12 to be processed by the system 10 is input in digital form. If not already in digital form, the image may be converted to digital form prior to processing.

The extracted ROI 14 may be specified by reference coordinates of the ROI in the original image 12 or by image data for each pixel of the ROI.

A database 18 of training images is accessible to or incorporated in the system 10. For example, the database may be stored in memory 20.

The exemplary system may be embodied in a computing device 22, which may be linked to a display 24, such as a user's screen. The computing device 22 may comprise one or more general purpose or dedicated computers, e.g., a desktop or laptop computer, palmtop device, PDA, server, or combination thereof. In the exemplary embodiment, the system 10 is hosted by a server 22 and is accessed using a web browser on a user's computing device 26, e.g., via a wired or wireless link 28 between the device 26 and the server 22, such as a local area network or a wide area network, such as the Internet. In another embodiment, system 10 is incorporated into a workflow system, such as a print path, which may be resident, for example, on a digital front end of a printer or linked thereto. In another embodiment, the system 10 may be resident on a user's computer. In various embodiments, the user may be provided with the opportunity to accept, reject, or modify a proposed ROI 14 generated by the system 10. In other embodiments, the system operates fully automatically, without user input.

The system 10 may be linked to a source of digital images, which provides an original image 12 to the system. The source may be the device 26 or a separate source. In one embodiment, an original image 12 is received by the system 10 in electronic form via the Internet. In other embodiments, the image 12 may be transferred to the system from a disk or other tangible recording medium or from memory associated with a workflow system. The original image 12 may be processed by the system and the ROI 14 output in electronic form or rendered in tangible media. For example, as illustrated in FIG. 1, the exemplary system 10 is linked to a printer 30, such as a xerographic or inkjet printer, which renders the ROI image 14 on print media, such as paper, using colorants, such as inks or toners, or incorporates it into a document to be printed.

The exemplary image processing system 10 may be embodied in hardware, software, or a combination thereof. In the exemplary embodiment, the system 10 may comprise image processing components 40, 42, 44, 46, 48 in the form of software instructions, stored in the computing device's main memory 50, which are executed by an associated processor 52. Input images 12, while undergoing processing, may be stored in data memory 54, which may be the same as memory 20 or a separate memory. The various components of the system 10 may communicate via a data/control bus 60 and interface with external components via an input output I/O device 62.

The memory 20, 50, 54 may represent any type of computer readable medium such as random access memory (RAM), read only memory (ROM), magnetic disk or tape, optical disk, flash memory, or holographic memory and may be separate or combined. In one embodiment, the memory 20, 50, 54 comprises a combination of random access memory and read only memory. In some embodiments, the processor 52 and memory 20, 50, 54 may be combined in a single chip.

The various image data processing components may include an image identification and/or retrieval component 40, for identifying and optionally retrieving a subset of similar images from the database 18, an optional image registration component 42, for registering the similar images, with respect to a similar object that they contain, such as a face, an ROI probability estimator 44, which generates an ROI probability map based on reference coordinates of the ROI's in the similar images, optionally an ROI detector 46 which uses conventional ROI detection methods, based on the image 12, to propose one or more ROI's, and an ROI extractor which extracts an overall ROI, based on the probability map and optional detected ROIs output by detector 46. These components 40, 42, 44, 46, 48 may operate on the image 12 generally in the sequence shown. As will be appreciated, these components may each be embodied in software or hardware or a combination thereof. While the illustrated components are software components located in the same memory, it is also contemplated that the components may be distributed over one or more computer devices. Components 40, 42, 44, 46, 48 are best understood with respect to the exemplary method of generating an inset image, which will now be described.

FIG. 2 illustrates a method for extracting an ROI from an original image which may be performed with the apparatus illustrated in FIG. 1. The method assumes the existence of a set of training images which has been manually processed to identify an ROI for each training image.

The method begins at S100.

At S102, a set of training images is provided, each training image in the set having a respective identified region of interest. The training images and information on the manually extracted ROIs may be stored in database 18. Each extracted ROI may be identified by its reference coordinates, as described below.

At S104, an original image 12 to be processed is input to the system 10 and may be stored in data memory 54 during processing.

At S106, a subset of similar training images is identified. Specifically, based on a computed measure of similarity between the digital image and the images in the set of training images, a subset of the training images is automatically identified and optionally retrieved from the set of training images. The subset may comprise images of the training set having the highest similarity (according to the measure used) to the input image. Various measures for determining similarity are described below.

At S108, the reference coordinates of the ROI of each of the similar images in the subset are also retrieved Optionally, at S110, the similar images may be registered, based on a characterizing object, such as a face.

At S112, a determination of ROI probability for the original image is performed based on the reference coordinates of the ROI's of the similar images.

At S114, optionally, one or more other detection techniques may be used to supplement the ROI evaluation performed in S112.

At S116, an ROI is computed (i.e., extracted) for the input image, based on the probability map(s) generated at S112 and optionally S114.

At S118, the image may be cropped, based on the computed ROI, to generate a cropped image. The cropped image may be output to an output device, such as a display screen or a printer.

The method ends at S120.

As will be appreciated, where regions of interest are to be extracted from each of a set of original images, the same set of training images can be used as a basis for performing the exemplary method. Assuming that the original images are heterogeneous, for each original image, a different subset of the training images is selected based on similarity.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method and system may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for automatically extracting an ROI from an image.

Further details of the system and method now follow.

The Dataset of Training Images (S102)

The dataset of training images may include a multiplicity of images characterized by different contents, visual aspects, and the like. The images may include portraits, landscapes, pictures of sporting events, buildings, plants, animals, vehicles, other objects, close-ups, modified images, and the like to provide a heterogeneous content. The dataset may contain a large number of images derived from a variety of sources, such as user images, online websites, and the like. For example, the dataset may contain in excess of 1000 images, such as about 5000-100,000 images or more.

If the images 12 to be processed are from a specific source (e.g., newspaper images), prior images from the same source may be used as training images.

In some embodiments, textual information may be associated with the training images, either as part of the image or as metadata, which may be used in the retrieval step (S106).

Figure 3:
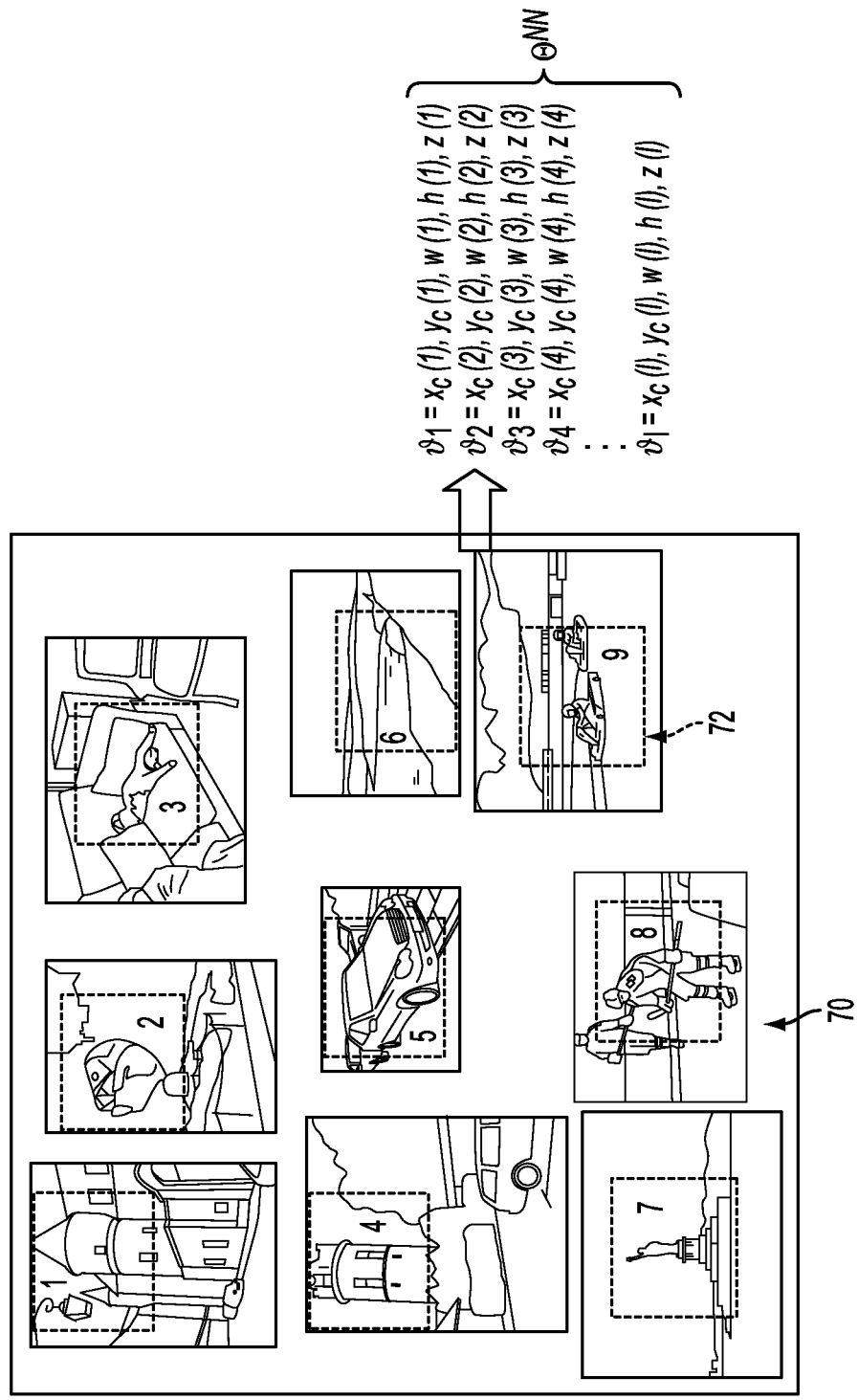
FIG. 3 illustrates exemplary rescaled training images in which parameters of manually identified ROIs are extracted as vectors.

For each image, a manually identified ROI is available. The ROI may have been manually extracted by a skilled graphic designer. FIG. 3 illustrates a few exemplary training images 70 forming part of an exemplary training set, for which a ROI 72 is identified for each. In generating the ROI, the designer may use resealing (downscaling) and cropping operations to reduce the dimensions of the image to a fixed area for extracting an ROI.

Each image in the training set has an ROI which is described by its reference coordinates. In particular, ROI i may be entirely described by the parameter vector $\vartheta$ =[$x_c(i)$, $y_c(i)$, $w(i)$, $h(i)$, $z(i)$], that includes the ROI's center of mass ($x_c(i)$, $y_c(i)$), its dimensions (height $h(i)$ and width $w(i)$, expressed in number of pixels) and a resealing factor $z(i)$, which has been applied to the original image in order that all the images in the training set may have a maximum and/or minimum fixed height or width. These dimensions may be reasonably set, based on the size of the display device on which the image will be displayed, such as a mobile phone screen. The resealing factor $z(i)$=area of rescaled image/original area of image prior to resealing.

Consequently, a matrix $\Theta$ can be defined as follows:

$$\Theta = \begin{bmatrix} \vartheta_1 \\ \vartheta_2 \\ \ldots \\ \vartheta_I \end{bmatrix} = \begin{bmatrix} x_c(1), y_c(1), w(1), h(1), z(1) \\ x_c(2), y_c(2), w(2), h(2), z(2) \\ \ldots \\ x_c(I), y_c(I), w(I), h(I), z(I) \end{bmatrix}$$

with the vectors $\vartheta$ in the rows expressing the parameters of the ROI associated to the i-th image in the dataset for a dataset made up of I images.

Input of Original Image (S104)

Typically, each input digital image 12 includes image data for an array of pixels forming the image. The image data may include colorant values, such as grayscale values, for each of a set of color separations, such as RGB, or be expressed in another other color space in which different colors can be represented. In general, "grayscale" refers to the optical density value of any single image data channel, however expressed (e.g., RGB, YCbCr, etc.). The images may be photographs which are received in JPEG, GIF, JBIG, BMP, TIFF or other common file format used for images and which may be converted to a suitable format for processing. In the exemplary embodiment, the images 12 are photographs, however, the images may also be in the form of video images, combined images which include photographs along with text, and/or graphics, or the like.

Identification of Similar Images in the Training Set (S106)

In the image retrieval step, a subset of training images with high similarity to the input image 12 is identified from the training dataset. For example, the K-Nearest Neighbor images are retrieved from the existing dataset of pictures with manually selected ROIs. An object of this step is to select, from the training dataset, the images with the highest similarity with respect to the input image $I_{in}(x, y)$ to be cropped. The similarity can be defined at different levels: signal level (e.g., spectral, color, structural similarity) or semantic level (content similarity based on visual or textual information). Depending on the features extraction criteria adopted, the similarity between two images is a measure based on the selected features extracted. Exemplary methods of clustering images which may be employed herein for determining similarity may be based on methods described in one or more of above mentioned U.S. Pub Nos. 20080069456, 20070005356, 20070258648, 20070239745 (textual clustering), incorporated by reference, and J. Verbeek, N. Vlassis, "Gaussian fields for semi-supervised regression and correspondence learning," in Pattern Recognition, October 2006, vol. 39, no 10, pp. 1864-1875; and J. Goldberger, S. Gordon and H. Greenspan, "An Efficient Image Similarity Measure based on Approximations of KL-Divergence Between Two Gaussian Mixtures", ICCV (2003).

In one embodiment, similar images may be identified by extracting low level features from the input image 12, generating a higher level representation of the input image based on the low level features, and comparing the higher level representation with higher level representations of images in the training set which have been similarly generated.

The low level features may be extracted from patches (small regions) of the image. For each patch, one or more types of low level feature is extracted, which is representative of the patch. Exemplary low level features which can be used include, for example, gradient histograms, vectors, and the like. The low level features can include, for example, feature vectors based on texture, color, shape, structure, or a combination thereof, such as Scale Invariant Feature Transform (SIFT) descriptors. The patches can be obtained by image segmentation, by applying specific interest point detectors, by considering a regular grid, or by or simply random sampling of image patches.

For example, Scale Invariant Feature Transform (SIFT) descriptors (as described by Lowe, in "Object Recognition From Local Scale-Invariant Features", ICCV (International Conference on Computer Vision), 1999) are computed on the patches extracted by the patch extractor (e.g., normalized Harris affine regions or patches extracted on a grid). SIFT descriptors are multi-image representations of an image neighborhood. More specifically, SIFT descriptors are generally Gaussian derivatives computed at eight orientation planes over a four-by-four grid of spatial locations, giving a 128-dimensional vector. The dimensionality of the vectors may be reduced, for example, using principal component analysis (PCA), to about 50 dimensions without significant loss of information.

The higher level representation may be based on a bag of visual word (BOV) based approach, as described, for example, in above-mentioned U.S. Pub. No. 20080069456. In this approach, the image is characterized by a histogram of visual word counts. Each feature vector is assigned to its closest visual word in a previously trained vocabulary or to all visual words in a probabilistic manner in the case of a stochastic model. The histogram is computed by accumulating the occurrences of each visual word.

The training images are then scored based on the similarity of their high level features (e.g., histogram of visual words) to the high level features of the input image.

In one implementation, the adopted similarity measure between two histograms of visual histograms is depicted in the following formula:

$$d(x, y) = -\left\| \frac{x}{\|x\|_1} - \frac{y}{\|y\|_1} \right\|_1$$

where x and y represent two histograms of visual words of two different images.

As an example, two types of low level features (e.g., structural and color features) are extracted and a similarity measure between the input image and each of the training images is computed for each of these feature types. A combined similarity measure can be computed a function of the two similarity measures. Based on the similarity measure, the K-Nearest Neighbor (NN) images are extracted from the dataset of training images for the input image. K is selected to provide a representative subset of the training images, such as from about 0.1% to 5% of the training images, e.g., about 1% or less of the training images. In general, K is at least 10 and may be up to about 500.

In a 21,000 image training set, K=75 is a suitable value.

Retrieval of Reference Coordinates (S108)

For each training image, the reference coordinates (including position and the dimensions) of a pre-segmented ROI are available in the matrix Θ. At S108, the reference coordinates of ROIs for the images in the subset of similar images are retrieved. In particular, for the K nearest neighbor images, from Θ the parameters of the corresponding pre-segmented ROIs are retrieved. A matrix $\Theta^{NN}$ can be defined for the subset of images. This matrix has dimensions K×5, and contains in each row the parameters of the vectors $\vartheta$.

Note that in some embodiments, it is not necessary for the K training images themselves to be retrieved from the database, just their ROI reference coordinates.

Image Registration (S110)

In this optional step, the images selected in the previous step may be transformed into a reference coordinate system. In particular, rotation and rescaling operations may be performed. In this transformation, the content of the images can be taken into account (See J. Verbeek, N. Vlassis, "Gaussian fields for semi-supervised regression and correspondence learning," in *Pattern Recognition*, October 2006, vol. 39, no 10, pp. 1864-1875.)

This step is optional and may involve identifying an object of interest such as a face, in each of the images and applying geometric transforms, such as affine transforms, rotation, scaling, or the like to bring the object of interest to approximately the same location (e.g., the center) in each image. The ROI of the image will follow the transformation. As an example, two images of the same subject and same ROI, but shifted toward some direction may benefit from this registration step.

Evaluation of ROI Probability (S112)

In this step, a probability map is created using the reference coordinates of each ROI in the retrieved images.

Figure 4:
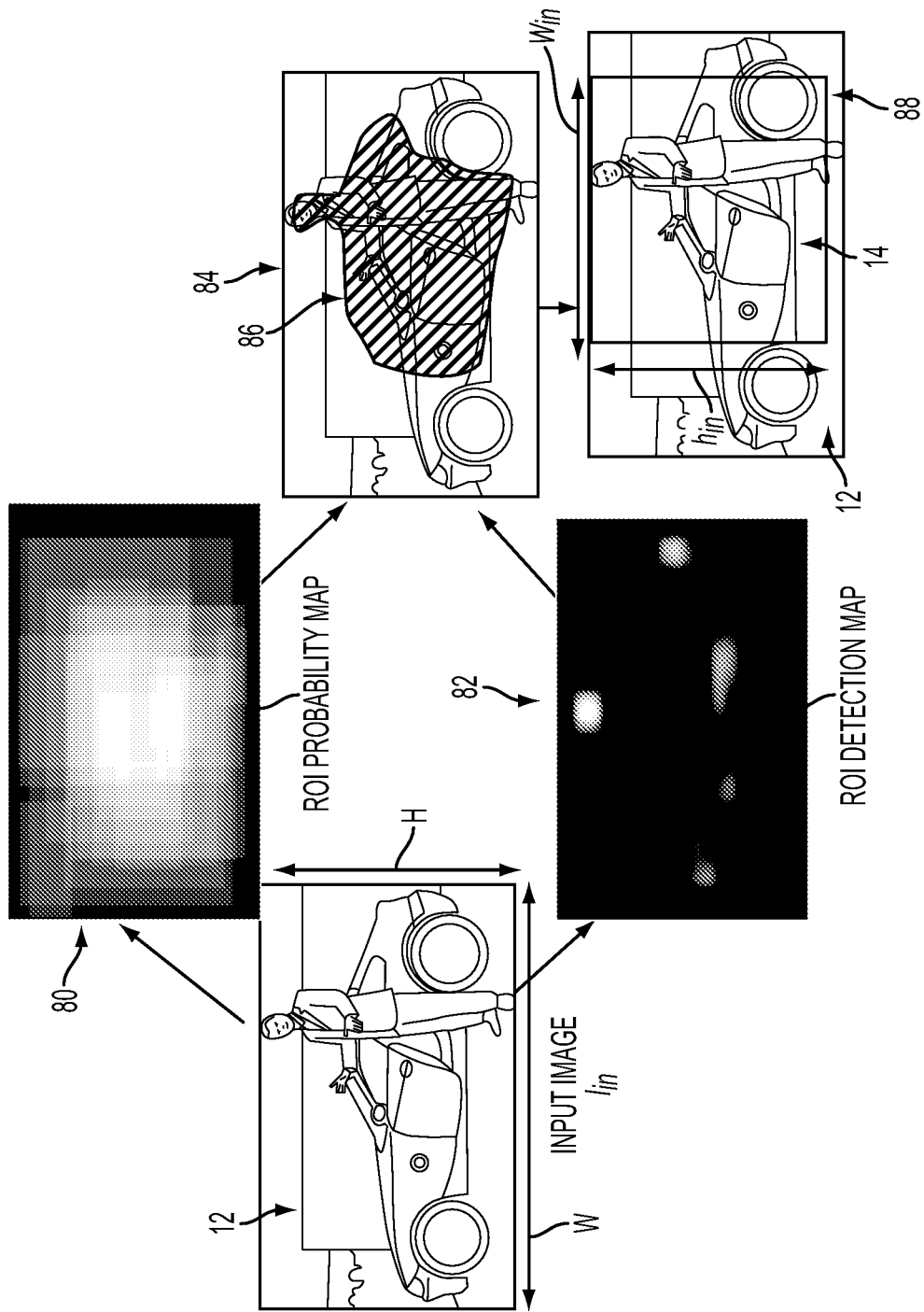
FIG. 4 illustrates the generation of ROI probability and detection maps for an original image and combining them to form an ROI.

The probability map can be created as illustrated in FIG. 4. In particular, given an original image 12 of height H and width W, the ROIs of the similar images are combined to form a cropping probability map 82 of the same dimensions. To achieve this, a probability map indicating the likelihood that a pixel belongs to an ROI is generated for each image in the subset. This may be a binary map in which each pixel is assigned a value of 0 (if it is not in the area of the training image from which the ROI was extracted) or 1 (if it is within the area of the training image from which the ROI was extracted). Then, a cropping probability (CP) map is generated by combining the K probability maps associated with the images.

In one embodiment, the probability map can simply be added for each pixel and then normalized. Thus for example, a pixel at the center of the map 80 which is within the ROI of 18 out of 20 of the similar images may be assigned a probability of 18/20=0.9. A pixel near the lower right of the map 80 which appears in only 1 ROI may be assigned a value of 1/20=0.05. Such an approach tends to give a map which lacks clearly defined borders.

In another implementation, the ROI probability p(x,y) can be defined using $\Theta^{NN}$ (the matrix of ROIs for the K nearest neighbor similar images). This map expresses the probability that a certain pixel x,y in $I_{in}(x,y)$ (i.e. input image) belongs to the region to crop. The following steps are applied to determine the probability. First, the parameters in $\Theta^{NN}$ are rescaled to a target dimension using the z(i) value in order to consider the same scale for the considered images.

The ROI probability map 80 is then generated as follows. The probability of a pixel at x,y of the original image of being in the ROI may be suitably given by the expression:

$$p(x, y) = \sum_k \alpha_k N(\mu_k, \Sigma_k)$$

where for each row k in the matrix $\Theta^{NN}$, a Gaussian (function) N is fitted with center of mass $\mu_k=(x_c(k),y_c(k))$ and covariance matrix equal to $$\Sigma_k = \begin{bmatrix} w(k) & 0 \\ 0 & h(k) \end{bmatrix}.$$

Where w(k) and h(k) are the parameters of the covariance matrix and $\alpha_k$ is a parameter between 0 and 1 weighting each Gaussian. $\alpha_k$ can be proportional to the distance of the k-th nearest neighbor image to $I_{in}(x,y)$. The distance can be based on the similarity measure determined for the structure and color features. Thus, for those training images which are computed to be more similar (closer in distance) a higher weighting $\alpha_k$ is applied to the respective ROI's Gaussian. In another embodiment, each Gaussian is given the same weight, i.e., $\alpha_k$ may be 1 for all values of k.

The output of this step is a probability map 80 of p(x,y) in which each pixel is assigned a probability, e.g., between 0 and 1. The probability map p(x,y) can be binarized by applying a threshold, e.g., 0.7, so that all pixels with a probability of 0.7 or higher are given a value of 1 and those below the threshold are given a value of 0.

In another embodiment, the final probability map takes into account both map 80 and a map 82 generated with a saliency detector, as outlined below.

Other ROI Detection Techniques (S114)

In addition to the probability map 80 generated as described above in step S10, a second probability map 82 (FIG. 4) may be generated based on features of the image 12 itself, such as face or saliency detection. For example, a saliency map may be generated according to the method described in Itti and Koch, "A saliency-based search mechanism for overt and covert shifts of visual attention." Vision Research, vol. 40, pp 1489-1506 (2000). A probability map $\tilde{p}(x,y)$ 82 can thus be defined taking into account the full scale image 12 and a saliency detector. Note that in FIG. 4, where lighter regions are the most salient, according to this method, the saliency map picks out the face of the person in the picture. The combination of the ROIs probability map 80 with the saliency map 82 (e.g., by summing the two maps or a product or other function) yields a joint probability map which is based in part on the ROIs of similar images and in part on saliency. For example, in the binary joint probability map 84, the hatched area 86 includes those pixels having at least a threshold probability of being in an ROI in the first probability map as well as those having at least a threshold probability of being an ROI in the second probability map. This area is considered the most probable region of interest.

ROI Extraction (S116) and Cropping (S118)

As illustrated in FIG. 4, the extracted ROI 14 is a region entirely contained within the image 12. The ROI is computed, based on the probability map(s) generated at S112 and optionally S114. One or more ROIs are extracted by inspecting the Cropping Probability map 80 (and optionally 82).

At S118, the image may be cropped, based on the computed ROI, to generate a cropped image 14. The cropped image may be output to an output device, such as a display screen or a printer.

The general object of these steps is to generate a bounding box for the crop. One way to do this is to identify a bounding box which incorporates all (or a substantial proportion of, e.g., at least 90% or at least 95%) of those pixels having at least a threshold probability of being in an ROI, while at the same time avoiding the ROI from being too large and simultaneously maintaining a selected ratio of height to width. Various methods exist for determining a suitable cropped image, based on the ROI probability map, given such constraints. Examples of such techniques are described, for example, in U.S. application Ser. No. 12/033,434 and the references cited therein.

In a simplified method, a bounding box 88 (FIG. 4) of fixed h:w ratio and of minimum area is automatically drawn around the region 86 which contains all or substantially all the pixels having at least a threshold probability of being in an ROI. This box 88 forms the basis of the crop. The threshold probability can be selected such that a bounding box of at least a threshold area is generated.

The following method may be used for generating a crop of a regular shape, such as a rectangle. In this method, the parameters $\vartheta_n$ of the ROI to be cropped in the input image $I_{in}(x, y)$ are established. Various strategies can be utilized for combining $p(x, y)$ (map 80) with $\tilde{p}(x, y)$ (map 82) or by using them independently. In one implementation, an iterative approach is utilized in which the parameters of the bounding box for the crop are progressively modified (the box is reduced in size). The parameters used can be the same as those used for identifying the ROIs in the K nearest neighbor similar images, i.e., the eventual crop can be described by the parameter vector $\vartheta_n = [x_c(in), y_c(in), w(in), h(in), z(in)]$. The method may proceed as follows:

1. An ROI is centered in the center of the input image $I_{in}(x, y)$ and its dimensions are set to the mean of the dimensions of the K ROIs in $\Theta^{NN}$. A parameter $\delta_0$ is also initialized as the maximum pixel probability of the ROI probability map. Specifically, Initialize:

$$\vartheta_0 = [x_c(0), y_c(0), w(0), h(0), 1]$$
   $$= \left[ X_c, Y_c, \frac{1}{K}\sum_k w^k, \frac{1}{K}\sum_k h^k, 1 \right]$$
   $$\delta_0 = \max_{x,y}(p(x, y))$$

2. A new set of ROI parameters is evaluated:

$$\vartheta_{i+1} \text{BOUNDBOX}(p(x, y), \delta_i)$$
   $$\delta_{i+1} = \delta_i - \epsilon$$

where BOUNDBOX is a function that takes as input the ROI probability map and a threshold value $\delta_i$ and returns the minimum rectangle containing all the pixels x,y for which $p(x,y) > \delta_i$. $\delta_i$ is a value that defines the threshold above which a pixel is considered as belonging to the ROI.

3. The previous step is repeated until the following condition is satisfied:

$$w_{i+1} \cdot h_{i+1} > w(0) \cdot h(0)$$

i.e., the bounding box for the crop is equal to or bigger than the mean of the K nearest neighbors (so as to ensure to encompass all pixels above the threshold $\delta_i$). The bounding box of dimensions $w_{i+1} \cdot h_{i+1}$ can then be the basis of the crop.

The method and system described herein can be used in a variety of applications including variable data applications such as 1 to 1 personalization and direct mail marketing. In variable data printing, a document may be created with a space allotted for an image which varies according to the intended recipient. The image to be incorporated into a document may be limited to a certain size and shape. Conventional manual techniques of selecting an area to crop for each of a large number of different images may be too time-consuming and techniques based on saliency maps may be too general to be useful. The present application allows regions to crop to be identified, based on crops manually identified for similar images. Other automated workflow processing methods may similarly benefit.

Variable document creation poses various challenges to the assurance of a proper aesthetical level due the portion of dynamic content they include. One of them is how to treat visual aspects dynamically within the variable data workflow, so that the enhancement or management operations are handled in a more context sensitive fashion. The exemplary system and method allow for a more context sensitive cropping and resizing of images for such applications. Image and document asset management or document image/photograph set visualization, and the like can also profit from the exemplary embodiment, as described in the examples below.

Without intending to limit the scope of the exemplary embodiment, the following Example illustrates the effectiveness of the exemplary method.

EXAMPLE

Figure 5:
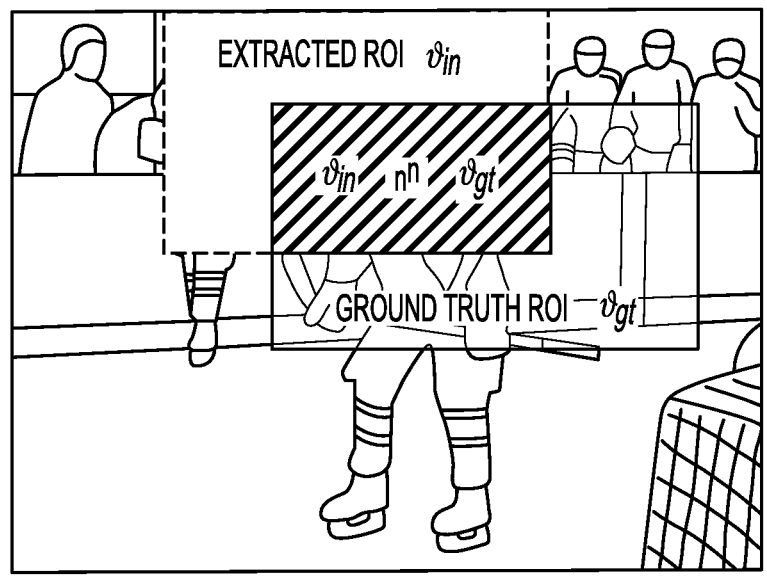
FIG. 5 illustrates the overlap of a ground truth (manually determined) ROI with an ROI generated automatically, for assessment of the accuracy for the exemplary method.

The exemplary method was compared with a method based on saliency maps, of the type described in Itti and Koch, referred to above. As illustrated in FIG. 5, for an example image 12, the performances of the approaches were measured with true and false positive ROI pixels:

1. True positives ROI's pixels=TP=Area($\vartheta_{gt} \cap \vartheta_{in}$)/Area($\vartheta_{gt}$)
2. False Positive ROI's pixels=FP=Area($\vartheta_{gt} \cap AC$)/Area($\vartheta_{in}$)

Where $\vartheta_{gt}$=parameter vector for the ground truth ROI (as manually assessed) $\vartheta_{in}$=parameter vector for the extracted ROI (by whatever method is used)

The dataset used in the context of this example is composed of about 21,000 photographs. An ROI of parameter vector $\vartheta$ was manually extracted for each photograph by a skilled graphic designer who used resealing and cropping operations to reduce the image to a fixed area. In one example, both structural and color similarity were taken into account in determining the similarity of the training photos to an input image. In another, only texture-based features were considered. For the exemplary method, the K-Nearest Neighborhood (with K=1, 50, or 75) dataset images for the input image. For the K-NN images the parameters of the corresponding pre-segmented ROIs are retrieved from Θ and another matrix $\Theta^{NN}$ with dimensions K×5 containing, in each row, a respective one of the selected parameter vectors is generated.

In Table 1 below, some results are listed comparing the performances of the exemplary method in different configurations with the saliency map detector.

TABLE 1

| Method | Structural and Color based | | Texture Based only | |
|---|---|---|---|---|
| | True Positives (TP) | False Positives (FP) | True Positives (TP) | False positives (FP) |
| Exemplary Method (k = 1) | 0.3889 | 0.3593 | 0.3694 | 0.3142 |
| Exemplary Method (k = 75) | 0.6173 | 0.3355 | 0.6214 | 0.3352 |
| Exemplary Method (k = 50) | 0.6316 | 0.3276 | 0.6347 | 0.3260 |
| Saliency Map | 0.4677 | 0.3377 | 0.4690 | 0.3372 |
| Saliency Map | 0.4801 | 0.3352 | 0.4801 | 0.3350 |

The exemplary method outperforms the approach based on the saliency maps. The best results is obtained using only the texture based image similarity with K=50, although similar results were obtained using structural and color features. The FP can be improved depending on the sizes of the crops considered.

By comparing histograms of TP for a group of images, it can be seen that there is a much larger percentage of cases where the saliency method produces a crop which misses the ground truth region entirely than for the exemplary method.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for extracting a region of interest from a digital image, the method comprising:
   from a set of training images, each training image in the set having a respective identified region of interest, with a processor, identifying a subset of similar training images, based on a measure of similarity between the digital image and the images in the set of training images, the identifying of the subset of similar training images comprising identifying the K nearest neighboring images, wherein K has a value of at least 10; and
   extracting a region of interest for the digital image based on the identified regions of interest in the subset of training images.

2. The method of claim 1, wherein the extracting of the region of interest for the digital image comprises:
   for each of a set of pixels of the digital image, computing a probability of being in a region of interest, based on the identified regions of interest of the similar training images; and
   extracting a region of interest based on the computed probability.

3. The method of claim 1, wherein the extracting of a region of interest for the digital image is also based on a saliency determination.

4. The method of claim 1, wherein the identified region of interest of each training image in the set of training images is described by a parameter vector of the general form $\vartheta = [x_c(i), y_c(i), w(i), h(i), z(i)]$, where $(x_c(i), y_c(i))$ represent the region of interest's center of mass, h(i) represents the height of the region of interest, w(i) represents the width of the region of interest, and z(i) represents a rescaling factor.

5. The method of claim 1, wherein the identifying of the subset of similar training images comprises extracting features from the digital image, deriving a representation of the image based on the extracted features, and comparing the representation with representations generated for the training images.

6. The method of claim 1, wherein the identifying of the subset of similar training images is based on at least one of the group consisting of spectral information, color, structural similarity, and content similarity.

7. The method of claim 1, wherein the number of training images in the set of training images is at least 20K.

8. The method of claim 1, wherein the computing the probability of a region of interest for the digital image comprises computing a probability map in which a probability is assigned to each pixel of the image of being in a region of interest.

9. The method of claim 8, wherein the probability of each pixel of the original image of being in a region of interest is a function of an optionally weighted sum of a set of Gaussian functions centered on the regions of interest of the similar images.

10. The method of claim 1, wherein the extraction includes extracting a region which contains all the pixels having at least a threshold probability of being in a region of interest.

11. The method of claim 10, wherein the extracted region has a preselected ratio of height to width.

12. The method of claim 10, wherein the threshold is selected such that the region has an area which is at least equal to a mean area of the regions of interest of the similar images.

13. The method of claim 1, further comprising registering the similar images and modifying reference coordinates of the respective identified regions of interest based on the registration.

14. The method of claim 1, further comprising:
prior to the identifying of the subset of similar training images:
for each image of a set of training images, manually identifying a region of interest within the image and storing reference coordinates of the region of interest.

15. The method of claim 1, wherein the extracting the region of interest for the digital image comprises extracting a first region of interest from the digital image, the method further comprising:
extracting a second region of interest for at least a second digital image based on identified regions of interest in a second subset of the training images; and
storing the first and second regions of interest.

16. A computer program product embodied on a non-transitory computer-readable medium encoding instructions which, when executed by a computer, perform the method of claim 1.

17. A variable printing method comprising:
forming a first document by combining image data with a first region of interest extracted from a first image by the method of claim 1;
separately, forming a second document by combining the same image data with a second region of interest extracted from a second image by the method of claim 1; and
printing the first and second documents.

18. A system for extracting a region of interest from a digital image, the system comprising:
memory which stores instructions for performing the method of claim 1; and
a processor, in communication with the memory, for executing the instructions.

19. A computer implemented system for extracting a region of interest from a digital image, the system comprising:
memory which stores a set of training images, each training image in the set being associated with a respective identified region of interest;
an image identification component for identifying a subset of the training images, based on a computed similarity measure between the digital image and the images in the set of training images, the identifying of the subset of similar training images comprising identifying the K nearest neighboring images, wherein K has a value of at least 10;
a probability estimator which, for pixels of the digital image, estimates the probability of being in a region of interest, based on the identified regions of interest of the subset of training images;
a region of interest extractor which extracts a region of interest for the digital image based on estimated probabilities; and
a processor which implements the image identification component, probability estimator and region of interest extractor.

20. The system of claim 19, further comprising a display for displaying the extracted region of interest.

21. The system of claim 19, wherein the probability estimator estimates the probability of being in a region of interest for the pixels based on reference coordinates of the identified regions of interest of the similar training images.

22. A computer-implemented method for extracting a region of interest from an image, the method comprising:
providing a set of training images, each training image in the set being associated with reference coordinates of a respective manually-identified region of interest in the image;
receiving an original image for which a region of interest is to be extracted;
with a processor, for the original image, identifying a subset of K nearest neighbor training images from the set of training images; and
generating a first probability map for the original image which assigns to pixels of the image, a probability of being in a region of interest based on the reference coordinates of the regions of interest in the K nearest neighbor training images;
optionally, generating a second probability map for the original image which assigns to pixels of the image a probability of being in a region of interest based on saliency features;
extracting a region of interest for the original image based on the first probability map and optionally the second probability map.

23. A computer program product embodied on a non-transitory computer-readable medium encoding instructions which, when executed by a computer, perform the method of claim 22.

* * * * *